United States Patent
Nagato et al.

(10) Patent No.: US 11,461,663 B2
(45) Date of Patent: Oct. 4, 2022

(54) INFORMATION PROCESSING APPARATUS, INFORMATION PROCESSING METHOD FOR IMAGE PROCESSING, AND STORAGE MEDIUM

(71) Applicant: FUJITSU LIMITED, Kawasaki (JP)

(72) Inventors: Tsuyoshi Nagato, Isehara (JP); Tetsuo Koezuka, Hachioji (JP)

(73) Assignee: FUJITSU LIMITED, Kawasaki (JP)

( * ) Notice: Subject to any disclaimer, the term of this patent is extended or adjusted under 35 U.S.C. 154(b) by 852 days.

(21) Appl. No.: 16/369,824

(22) Filed: Mar. 29, 2019

(65) Prior Publication Data
US 2019/0228314 A1 Jul. 25, 2019

Related U.S. Application Data

(63) Continuation of application No. PCT/JP2016/081682, filed on Oct. 26, 2016.

(51) Int. Cl.
*G06N 3/12* (2006.01)
*G06N 3/08* (2006.01)
(Continued)

(52) U.S. Cl.
CPC ............. *G06N 3/126* (2013.01); *G06F 11/36* (2013.01); *G06N 3/086* (2013.01); *G06N 3/12* (2013.01); *G06N 20/20* (2019.01)

(58) Field of Classification Search
CPC .......... G06N 3/126; G06N 3/12; G06N 20/20; G06N 5/003; G06N 5/00; G06N 3/08; G06F 11/36
See application file for complete search history.

(56) References Cited

U.S. PATENT DOCUMENTS

2015/0287160 A1* 10/2015 Nagato ................ G06T 1/20
                                                            382/307
2017/0083295 A1   3/2017 Nagato et al.

FOREIGN PATENT DOCUMENTS

JP   2002-366929 A   12/2002
JP   2007-087055 A    4/2007
(Continued)

OTHER PUBLICATIONS

Shirakawa et al. "Genetic Image Network (GIN): Automatically construction of Image Processing Algorithm", IWAIT, 2007, pp. 6.*
(Continued)

*Primary Examiner* — Li Wu Chang
(74) *Attorney, Agent, or Firm* — Fujitsu Patent Center

(57) ABSTRACT

An information processing apparatus includes a memory that stores information indicating a first individual and a processing result that is output by each node of the first individual in a process of executing image processing based on the first individual; and a processor coupled to the memory and configured to: generate a second individual based on the first individual; specify subtrees that have the same content and include terminating nodes between a tree structure indicating the second individual and a tree structure indicating the first individual; and set a processing result corresponding to a head node of the subtree included in the first individual, which is stored in the memory, as a result of executing image processing based on the subtree included in the second individual when adaptability of the second individual is calculated based on a result of executing image processing based on the second individual.

9 Claims, 12 Drawing Sheets

(51) Int. Cl.
    *G06N 20/20*     (2019.01)
    *G06F 11/36*     (2006.01)

(56) References Cited

FOREIGN PATENT DOCUMENTS

| | | |
|---|---|---|
| JP | 2007-140643 A | 6/2007 |
| JP | 2011-179874 A | 9/2011 |
| WO | 2015/194006 A1 | 12/2015 |

OTHER PUBLICATIONS

JPOA—Office Action of Japanese Patent Application No. 2018-546982 dated Sep. 10, 2019 with Partial Machine translation.

Shinya Aoki et al., "ACTIT: Automatic Construction of Tree-structural Image Transformations", ITE Transactions on Media Technology and Applications, vol. 053, No. 6, pp. 888-894, Jun. 20, 1999 (Total 19 pages).

Toshihiro Ushiyama et al., "Fast Automatic Construction of Tree-structural Image Transformation; ACIII", The 16th Auunal Conference of Japanese Society for Artificial Intelligence, 2002, pp. 1-2, [Online] Jul. 10, 2003, [retrieval date Nov. 29, 2016] Internet: <URL:https://www.jstage.jst.go.jp/article/pjsai/JSAI02/0/JSAI02_0_152/_pdf> <DOI: 10.11517/pjsai.JSAI02.0.152.0>.

International Search Report and Written Opinion of the International Searching Authority (Form PCT/ISA/210 and 237) mailed in connection with PCT/JP2016/081682 and dated Dec. 13, 2016 (12 pages).

* cited by examiner

FIG. 12
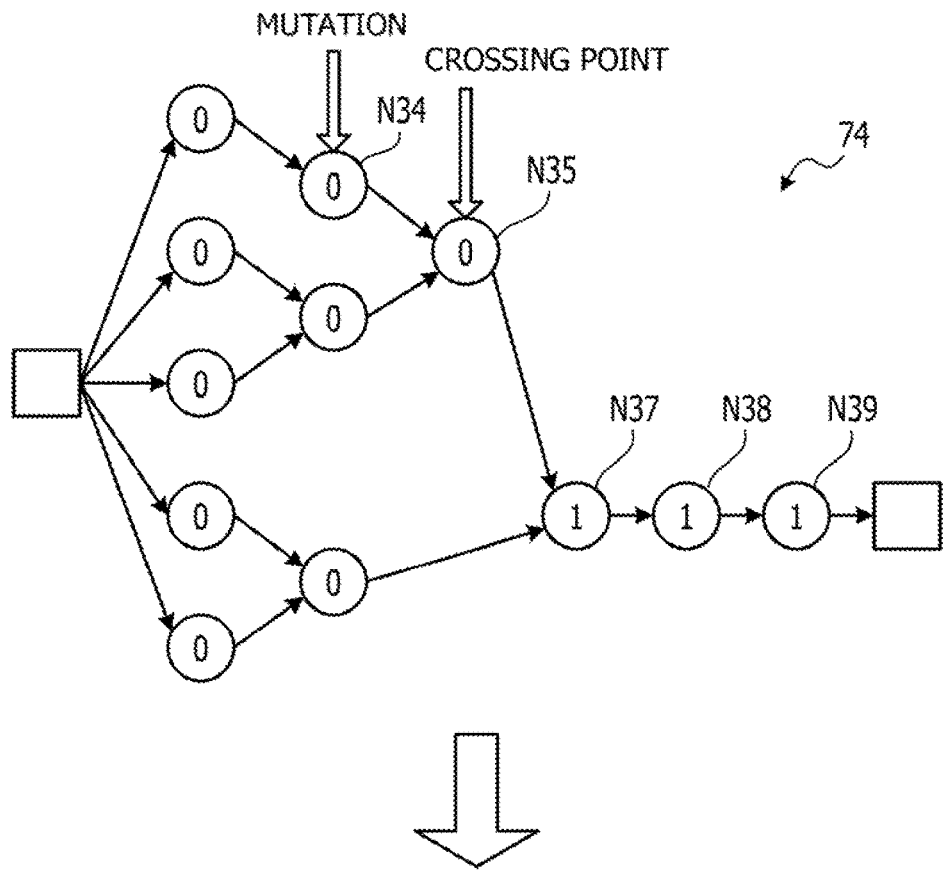
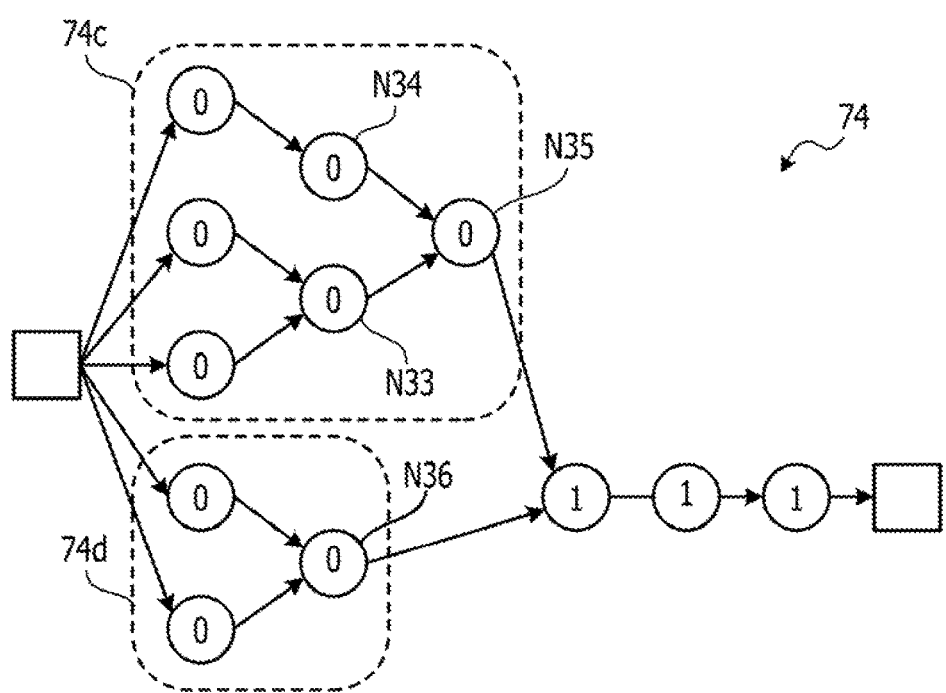

INFORMATION PROCESSING APPARATUS, INFORMATION PROCESSING METHOD FOR IMAGE PROCESSING, AND STORAGE MEDIUM

CROSS-REFERENCE TO RELATED APPLICATION

This application is a continuation application of International Application PCT/JP2016/081682 filed on Oct. 26, 2016 and designated the U.S., the entire contents of which are incorporated herein by reference.

FIELD

The embodiments discussed herein are related to an information processing apparatus, an information processing method, and a storage medium.

BACKGROUND

A technology for automatically generating an image processing program for executing desired image processing using genetic programming has attracted attention. According to the technology, an individual indicating an image processing program is expressed with a tree structure that has one or more nodes, each of which corresponds to a program element for image processing. A slave individual is generated based on a master individual of a specific generation, and image processing based on the generated slave individual is executed using an input image given as learning data. Adaptability of the slave individual is calculated by comparing a result of the processing with a target processing result (target image, for example) given as learning data, The image processing program is optimized by selecting an individual to be replaced based on the adaptability.

There is a proposal described below as a technology related to the genetic programming. For example, an evolution calculation system adapted to specify a gene as a node of connection destination such that a connectivity number is satisfied when phenotype individual structure information that describes a connection relationship between genes is generated. A parallel-type image filtering automatic generation system using genetic programming into which size-depending crossing is introduced has also been proposed.

As related arts, Japanese Laid-open Patent Publication No. 2007-87055, Japanese Laid-open Patent Publication No. 2011-179874, Shinya Aoki and Tomoharu Nagao "ACTIT: Automatic Construction of Tree-structural Image Transformations", ITE Transactions on Media Technology and Applications, Vol. 53, No. 6, Jun. 20, 1999, p. 888 to 894, and the like have been disclosed.

In the process of generating an image processing program using the genetic programming, adaptability of the slave individual is calculated every time generation change occurs. Here, although the generation change is performed many times in order to finally obtain an image processing program with high performance, there is a problem that the total time for the processing of calculating the adaptability increases as the number of times the generation change is performed increases. Image processing based on a tree structure becomes more complicated, and in accordance with the complication, the time for calculating the adaptability of each slave individual also increases as the tree structure of the individual becomes more complicated in order to generate the image processing program with high performance. If the time for calculating the adaptavility increases in this manner, the time until an optimal individual is obtained increases. In view of the aforementioned circumstances, it is desirable that the time for calculating the adaptability of the slave individual may be reduced.

SUMMARY

According to an aspect of the embodiments, an information processing apparatus includes a memory that stores information indicating a first individual that is expressed with a tree structure that has one or more nodes, each of which corresponds to a program element for image processing and a processing result that is output by each node of the first individual in a process of executing image processing based on the first individual; and a processor coupled to the memory and configured to: generate a second individual as a candidate of an individual of a next generation in genetic programming based on the first individual; specify subtrees that have the same content and include terminating nodes between a tree structure indicating the second individual and a tree structure indicating the first individual; and set a processing result corresponding to a head node of the subtree included in the first individual, which is stored in the memory, as a result of executing image processing based on the subtree included in the second individual when adaptability of the second individual is calculated based on a result of executing image processing based on the second individual.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 12 is a diagram illustrating an example of matching target subtree specification processing based on crossing points and mutation points.

DESCRIPTION OF EMBODIMENTS

Hereinafter, embodiments of the disclosure will be described with reference to drawings.

First Embodiment

Figure 1:
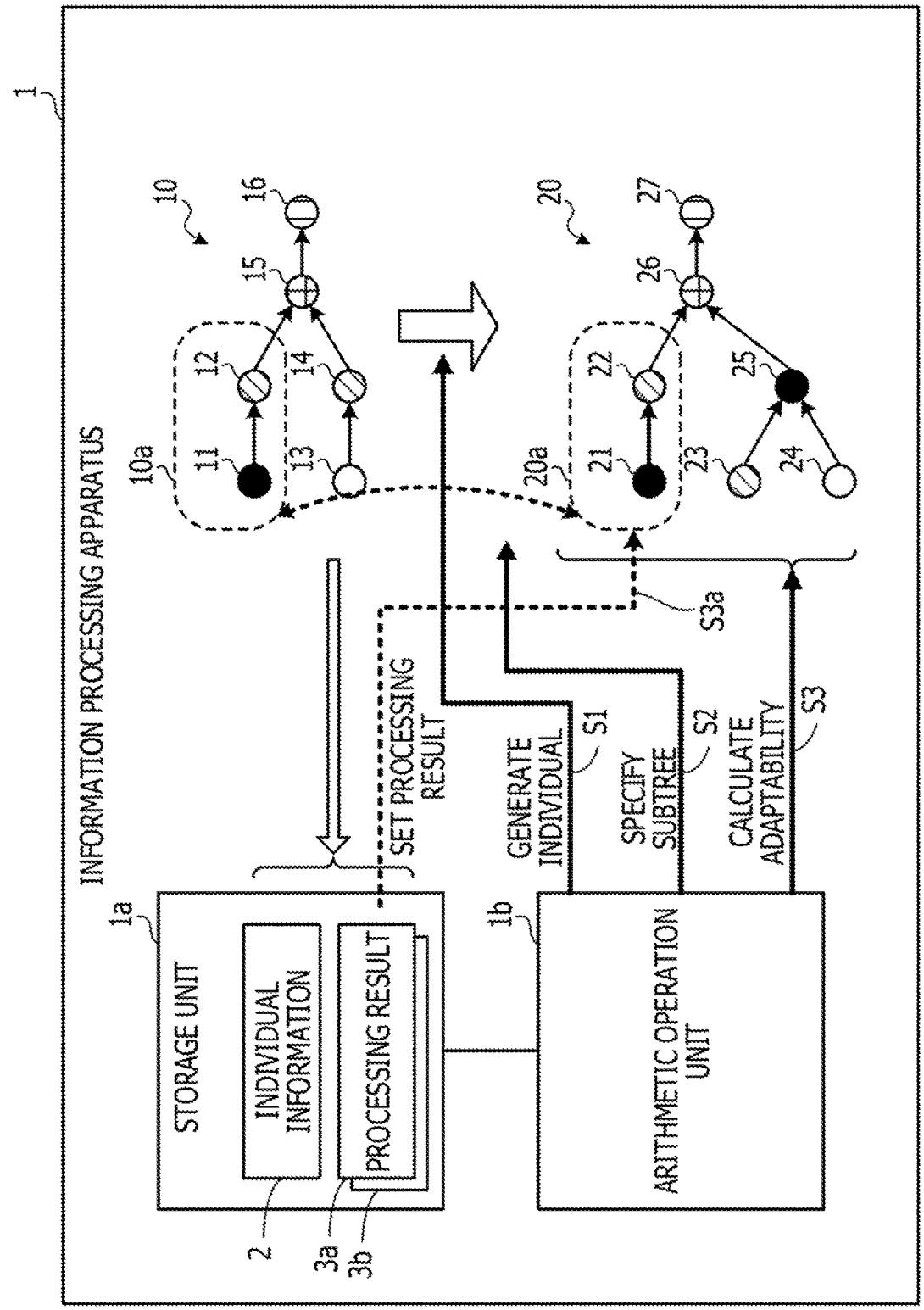
FIG. 1 is a diagram illustrating a configuration example and a processing example of an information processing apparatus according to a first embodiment.

FIG. 1 is a diagram illustrating a configuration example and a processing example of an information processing apparatus according to a first embodiment. An information processing apparatus 1 according to the first embodiment is an apparatus that generates an image processing program using the genetic programming. The information processing apparatus 1 has a storage unit 1a and an arithmetic operation unit 1b. The storage unit 1a is implemented as a volatile storage device such as a random access memory (RAM) or a non-volatile storage device such as a hard disk drive (HDD) or a flash memory, for example. The arithmetic operation unit 1b is a processor, for example.

The storage unit 1a stores individual information 2 indicating a first individual 10 and processing results 3a, 3b, . . . Corresponding to the respective nodes of the first individual 10. The first individual 10 is an individual that may be selected as a master individual in an evolution process of the genetic programming and is expressed with a tree structure that has one or more nodes, each of which corresponds to program elements for image processing. In the example illustrated in FIG. 1, the first individual 10 is expressed with a tree structure that has six nodes 11 to 16.

In FIG. 1, the nodes 11 to 16 are illustrated by hatching circles that represent the nodes 11 to 16, respectively, in accordance with types of program elements. The same applies to a second individual 20, which will be described later.

Individual information 2 is information indicating a structure of the first individual 10, for example, and indicates a connection relationship between the nodes, types of the program elements incorporated in the respective nodes, and the like. The processing results 3a, 3b, . . . Indicate processing results output by the nodes 11 to 16, respectively, in a process of executing image processing based on the first individual 10. The processing results 3a, 3b, . . . are obtained in a process of calculating adaptability of the first individual 10, for example.

The arithmetic operation unit 1b generates the second individual 20 as a candidate of an individual of a next generation in the genetic programming, that is, as a slave individual based on the first individual 10 (S1). For example, the arithmetic operation unit 1b generates the second individual 20 through crossing processing between the first individual 10 and another individual, which is not illustrated in the drawing, or through mutation processing performed on any of the nodes of the first individual 10. The second individual 20 is expressed with a tree structure that has one or more nodes, each of which corresponds to program elements for image processing, similarly to the first individual 10. In the example illustrated in FIG. 1, the second individual 20 is expressed with a tree structure that has seven nodes 21 to 27.

Next, the arithmetic operation unit 1b specifies subtrees that have the same content and include terminating nodes between a tree structure indicating the second individual 20 and a tree structure indicating the first individual 10 (S2).

Here, the subtrees with mutually same content mean that the connection relationships of the nodes and the types of the program elements included in the respective nodes are the same as each other. In the example illustrated in FIG. 1, a subtree 10a included in the first individual 10 and a subtree 20a included in the second individual 20 are specified.

The subtree 10a includes a terminating node 11, and the subtree 20a includes a terminating node 21. A reason that the subtrees including the terminating nodes are respectively specified is that data input to the respective subtrees are to be the same in order to secure that output data of the respective subtrees is the same.

Next, the arithmetic operation unit 1b calculates adaptability of the second individual 20 in order to evaluate whether or not to leave the generated second individual 20 for the next generation (S3). Here, the adaptability is calculated based on a result of executing image processing based on the second individual 20. However, in the embodiment, the arithmetic operation unit 1b sets a processing result corresponding to a head node 12 in the subtree 10a that is the same as the subtree 20a as the result of executing the image processing based on the subtree 20a included in the second individual 20 among the processing results 3a, 3b, . . . stored in the storage unit 1a (S3a).

In this manner, the execution of the image processing based on the subtree 20a is omitted, and the result of executing the image processing based on the subtree 10a is as the result of executing the image processing based on the subtree 20a. As described above, the time for calculating the adaptability of the second individual 20 may be reduced by execution of a part of the image processing based on the second individual 20 being omitted.

Second Embodiment

Next, an image processing apparatus according to a second embodiment will be described. The image processing apparatus according to the second embodiment has a processing function that is similar to that of the information processing apparatus 1 illustrated in FIG. 1 and a function of executing the image processing program generated using the processing function, thereby performing image processing.

In the following description, a comparative example of image processing program generation processing using the genetic programming will be described first with reference to FIG. 2, problems of the comparative example will be described, and details of the image processing apparatus according to the second embodiment will then be described.

COMPARATIVE EXAMPLE OF IMAGE PROCESSING PROGRAM GENERATION PROCESSING

Figure 2:
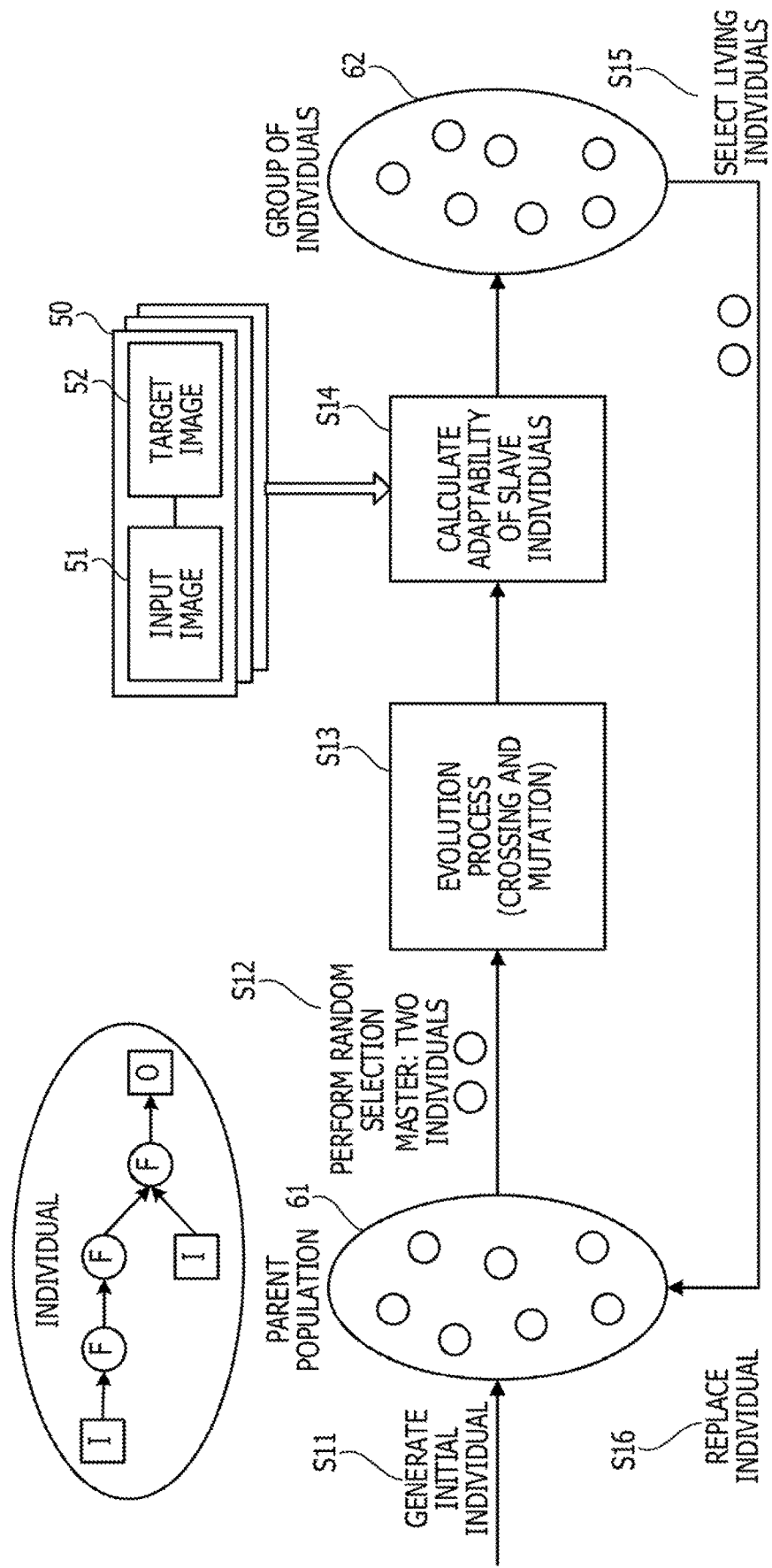
FIG. 2 is a diagram illustrating a comparative example of a procedure for image processing program generation processing.

FIG. 2 is a diagram illustrating a comparative example of a procedure for image processing program generation processing.

One or more learning data pieces 50 are prepared before the image processing program generation processing. The learning data pieces 50 include an input image 51 and a target image 52 when image processing is performed on the input image 51. The input image 51 is obtained by imaging an object with a camera, for example.

In the image processing program generation processing using the genetic programming, an individual is formed by combining one or more partial programs. For example, the individual is defined by a tree structure as illustrated in the upper left part in FIG. 2. The partial programs are incorporated in the respective nodes of the tree structure.

A plurality of partial programs that may be incorporated in the individual are also prepared in advance. Although image filtering is assumed below as an example of a partial program incorporated in the individual, the partial program is not limited to the image filtering, and a program for performing image processing of another type may also be used. In the upper left part in FIG. 2, "F" represents image filtering incorporated in a node, "I" represents an input terminal, and "O" represents an output terminal.

The image processing program generation processing using the genetic programming is executed as follows, for example. First, a plurality of initial individuals included in a parent population 61 are generated (S11). Image filtering is randomly selected from a plurality of types of image filtering prepared in advance and is incorporated in the nodes of the respective initial individuals.

In addition, the adaptability is calculated for the respective generated initial individuals. In the processing, the adaptability is calculated by the image processing using the respective initial individuals being executed on each input image 51 of the learning data pieces 50 and the image after the execution being compared with the corresponding target image 52. In a case in which a plurality of learning data pieces 50 are present, an average value of the adaptability obtained using the plurality of learning data pieces 50 is calculated for each of the initial individuals.

Next, a specific number of master individuals are randomly selected in the parent population 61 (S12). Hereinafter, it is assumed that two master individuals are selected in an example.

Next, two or more and a specific number of slave individuals are generated by the processing for the process of evolution being performed on the selected two master individuals (S13). In the process of evolution, crossing processing and mutation processing are performed on the two master individuals. Three or more slave individuals may be generated by mutually different crossing processing and mutation processing being performed on the two master individuals. That is, the number of generated slave individuals is equal to or greater than the number of master individuals selected from the parent population 61.

Next, the adaptability is calculated for the respective generated slave individuals (S14). In the processing, the adaptability is calculated by the image processing using the respective slave individuals being executed on each input image 51 of the learning data pieces 50 and the image after the execution being compared with the corresponding target image 52 similarly to the calculation of the adaptability of the initial individuals.

Here, in a case in which the adaptability of any of the generated slave individuals and the original master individuals is equal to or greater than a predetermined threshold value, the individual is output as a final image processing program, and the program generation processing is ended. Meanwhile, in a case in which the adaptability of all these individuals is less than the predetermined threshold value, living individual selection in a group of individuals 62 that includes the respective generated slave individuals and the two original master individuals is performed (S15). In the living individual selection, the individual with the maximum adaptability calculated is selected in the group of individuals 62. Further, one individual is selected from the remaining individuals in the group of individuals 62 by a predetermined method. For example, the individual is selected at a probability in accordance with the adaptability from the remaining individuals.

Two individuals selected through such living individual selection are replaced with two individuals selected as the master individuals among the individuals included in the parent population 61 (S16). In this manner, the individuals included in the parent population 61 are changed to individuals of the next generation. Similar processing is repeated until an individual with adaptability that is equal to or greater than the predetermined threshold value appears.

As a purpose of the image processing program generated by the procedure in the aforementioned comparative example, a purpose of obtaining a desired advantage by performing image processing on an image obtained by imaging a product in the field of factory automation (FA) is conceivable. For example, a purpose of extracting a location at which defect has occurred or extracting a location at which positioning is performed by performing image processing on an image obtained by imaging an appearance of a product is conceivable.

For such a purpose, there may be a case in which an image processing algorithm is to be reconstructed in accordance with modification and improvement of the product, which is the object, a change in an imaging environment that accompanies the modification or the improvement, and the like. Therefore, simple construction of the image processing algorithm has been desired. Also, construction of an image processing algorithm with high robustness against a change in the imaging environment such as a change in illumination conditions, the shape of the object, variation in position behavior, and the like has been desired.

Utilization of the genetic programming makes it possible to easily generate an image processing program that can be used for such a purpose merely by preparing the input image 51 and the target image 52 corresponding to the input image 51. It is also possible to automatically generate an image processing algorithm with high robustness against a change in the imaging environment by preparing a plurality of pairs of input images 51 and target images 52 (learning data pieces 50) of respectively different imaging environments.

Problems in Comparative Example

The processing of calculating the adaptability of the slave individuals generated based on the master individuals is executed every time the slave individuals are generated in the aforementioned comparative example. Therefore, there is a problem that the number of times the adaptability of the slave individual is calculated becomes a huge number and this leads to an increase in time for performing the entire calculation processing. Also, the processing time of the input image using the image processing program indicated by the tree structure increases and the time for calculating the adaptability also increases as the tree structure of the slave individuals becomes more complicated. Further, the time for calculating the adaptability similarly increases as the image size of the input image increases. In the field of FA, in particular, there are many cases in which minute defect is detected in a large imaging field using a high-resolution camera, and the adaptability calculation time thus tends to increase.

Such an increase in time for calculating the adaptability may lead to an increase in time until generation of the image processing program is completed. Therefore, it is desirable to shorten the processing time for calculating the adaptability.

Details of Image Processing Apparatus According to Second Embodiment

In order to address the aforementioned problems, the image processing apparatus according to the second embodiment saves intermediate processing result obtained at each node when the adaptability of the initial individuals is calculated. The image processing apparatus specifies a subtree that conforms to the subtree included in the slave individuals in the tree structure of the master individual when the adaptability of the slave individuals is calculated. The image processing apparatus reads an intermediate processing result obtained by the specified subtree of the master individuals from the saved intermediate processing result, and using the intermediate processing result as a processing result of the subtree of the slave individuals, thereby avoiding execution of image processing using the subtree of the slave individuals. In this manner, it is possible to skip a part of the image processing included in the processing of calculating the adaptability of the slave individuals, and as a result, it is possible to shorten the time for performing the processing of calculating the adaptability.

Hereinafter, details of the image processing apparatus according to a second embodiment will be described.

Figure 3:
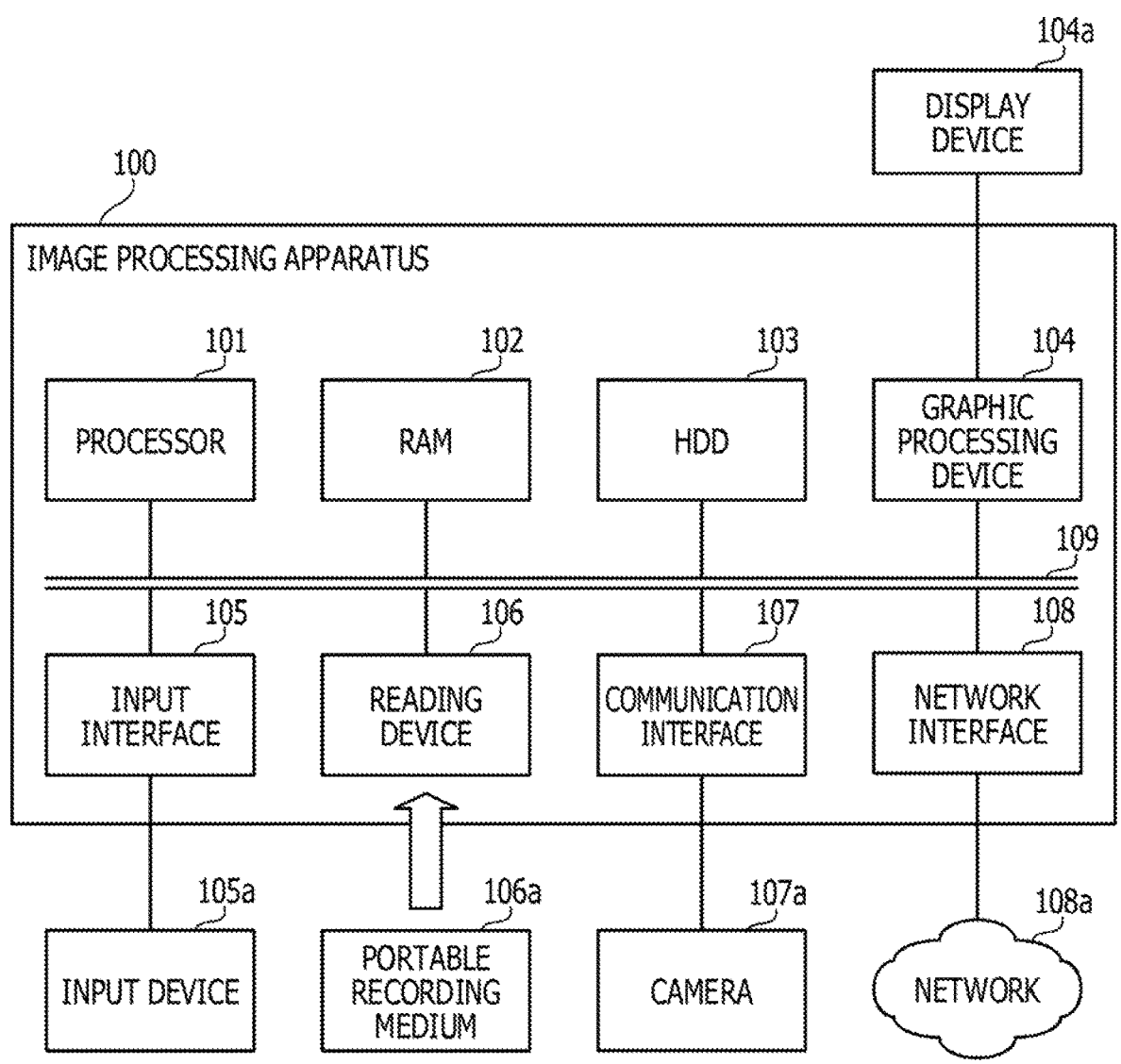
FIG. 3 is a diagram illustrating a hardware configuration example of an image processing apparatus.

FIG. 3 is a diagram illustrating a hardware configuration example of the image processing apparatus. An image processing apparatus 100 according to the embodiment is realized as a computer illustrated in FIG. 3, for example.

The entire image processing apparatus 100 is controlled by a processor 101. The processor 101 may be a multiprocessor. The processor 101 is a central processing unit (CPU), a micro processing unit (MPU), a digital signal processor (DSP), an application specific integrated circuit (ASIC), or a programmable logic device (PLD), for example. The processor 101 may be a combination of two or more elements among the CPU, the MPU, the DSP, the ASIC, and the PLD.

A RAM 102 and a plurality of peripheral devices are connected to the processor 101 via a bus 109.

The RAM 102 is used as a main storage device of the image processing apparatus 100. At least a part of an operating system (OS), a program, and an application program to be executed by the processor 101 is temporarily stored in the RAM 102. Various kinds of data used for processing performed by the processor 101 is stored in the RAM 102.

The peripheral devices connected to the bus 109 includes an HDD 103, a graphic processing device 104, an input interface 105, a reading device 106, a communication interface 107, and a network interface 108.

The HDD 103 is used as an auxiliary storage device of the image processing apparatus 100. An OS program, an application program, and various kinds of data are stored in the HDD 103. As the auxiliary storage device, it is also possible to use a non-volatile storage device of another type, such as a solid state drive (SSD).

A display device 104a is connected to the graphic processing device 104. The graphic processing device 104 causes the display device 104a to display an image on a screen thereof in response to a command from the processor 101. Examples of the display device 104a include a liquid crystal display, an organic electroluminescence (EL) display, and the like.

An input device 105a is connected to the input interface 105. The input interface 105 transmits a signal output from the input device 105a to the processor 101. Examples of the input device 105a include a keyboard, a pointing device, and the like. Examples of the pointing device include a mouse, a touch panel, a tablet, a touch pad, a track ball, and the like.

A portable recording medium 106a is attached to and detached from the reading device 106. The reading device 106 reads data recorded in the portable recording medium 106a and transmits the data to the processor 101. Examples of the portable recording medium 106a include an optical disc, a magneto-optical disc, a semiconductor memory, and the like.

The communication interface 107 transmits and receives data to and from an external device connected thereto. In the embodiment, a camera 107a is connected to the communication interface 107 as an external device, and the communication interface 107 transmits image data transmitted from the camera 107a to the processor 101.

The network interface 108 transmits and receives data to and from another device via a network 108a.

It is possible to realize processing functions of the image processing apparatus 100 with the aforementioned hardware configuration.

Figure 4:
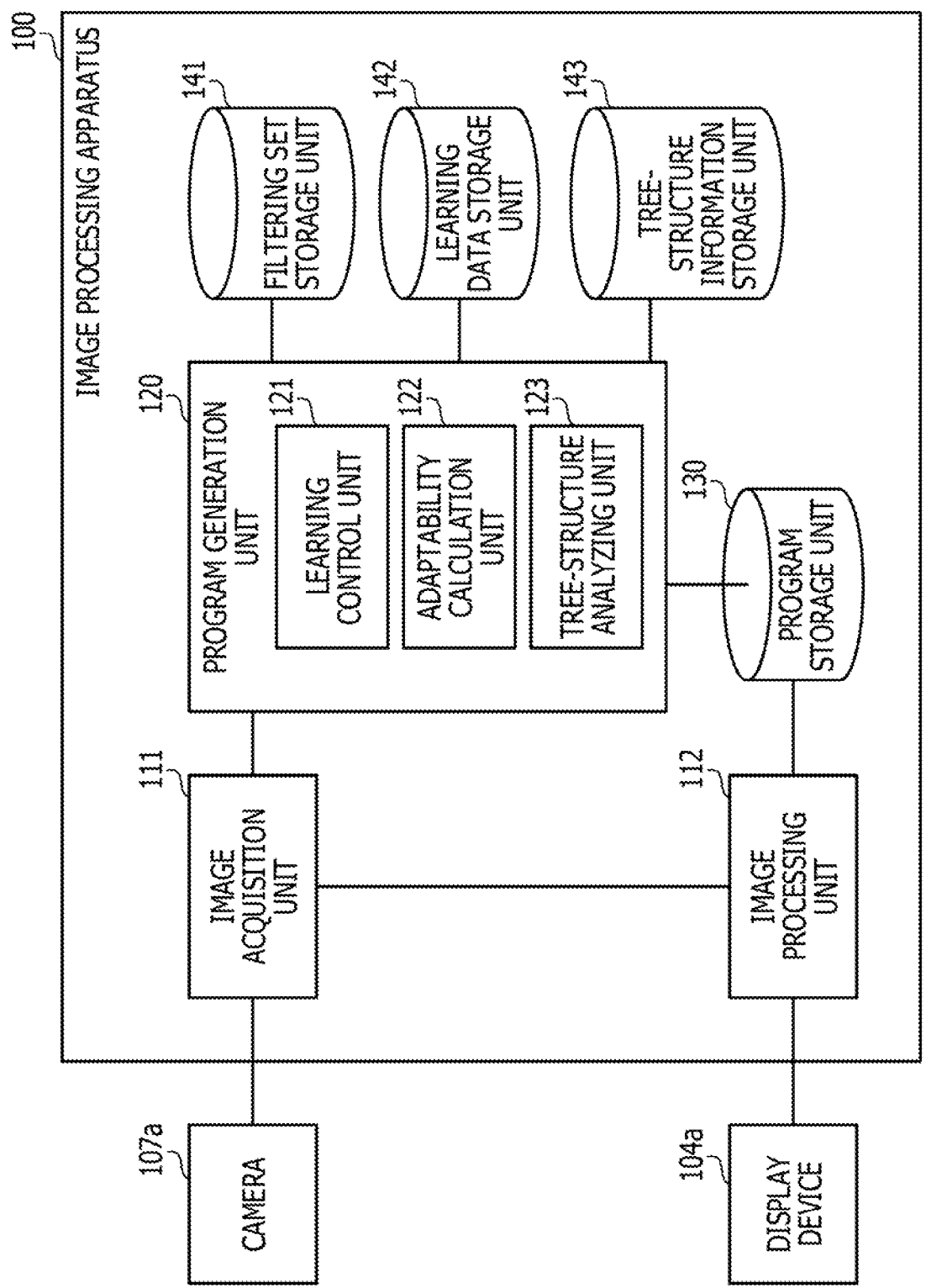
FIG. 4 is a block diagram illustrating a configuration example of processing functions that the image processing apparatus has.

FIG. 4 is a block diagram illustrating a configuration example of processing functions that the image processing apparatus has. The image processing apparatus 100 has an image acquisition unit 111, an image processing unit 112, a program generation unit 120, a program storage unit 130, a filtering set storage unit 141, a learning data storage unit 142, and a tree-structure information storage unit 143.

Processing performed by the image acquisition unit 111, the image processing unit 112, and the program generation unit 120 is realized by the processor 101 of the image processing apparatus 100 executing a predetermined program, for example. A part of the processing performed by the image processing unit 112 is realized by the processor 101 of the image processing apparatus 100 executing the image processing program saved in the program storage unit 130. The program storage unit 130, the filtering set storage unit 141, and the learning data storage unit 142 are realized as storage regions of the HDD 103 of the image processing apparatus 100, for example. The tree-structure information storage unit 143 is realized as a storage region of the RAM 102 of the image processing apparatus 100, for example.

The image acquisition unit 111 acquires data of an image captured by the camera 107a from the camera 107a and outputs the data to the program generation unit 120 or the image processing unit 112.

The program generation unit 120 generates an image processing program using the genetic programming and saves the generated image processing program in the program storage unit 130. An internal configuration of the program generation unit 120 will be described later.

The image processing unit 112 acquires data of an image captured by the camera 107a via the image acquisition unit 111. The image processing unit 112 performs image processing on the acquired image in accordance with the image processing program saved in the program storage unit 130. The image after the processing is displayed on the display device 104a, for example.

The program storage unit 130 stores the image processing program generated by the program generation unit 120.

The filtering set storage unit 141 stores a plurality of image filtering programs that can be incorporated in the nodes of the respective individuals generated by the program generation unit 120.

The learning data storage unit 142 stores one or more learning data pieces, each of which includes each data piece of an input image and a target image. The input image included in the learning data may be an image captured by the camera 107a that is connected to the image processing apparatus 100, for example.

Although it is assumed that an image is output as a result of processing using the generated image processing program in the example of the embodiment, information other than the image may be output as the result of the processing. As such a result of processing, positional information indicating a region in the input image, a result of classifying or evaluating the input image, or the like is conceivable, for example. In a case in which the result of the processing is not an image in this manner, the learning data may include information other than the image that indicates a target processing result instead of the target image.

The tree-structure information storage unit 143 stores information regarding the respective individuals included in the parent population 61.

Figure 5:
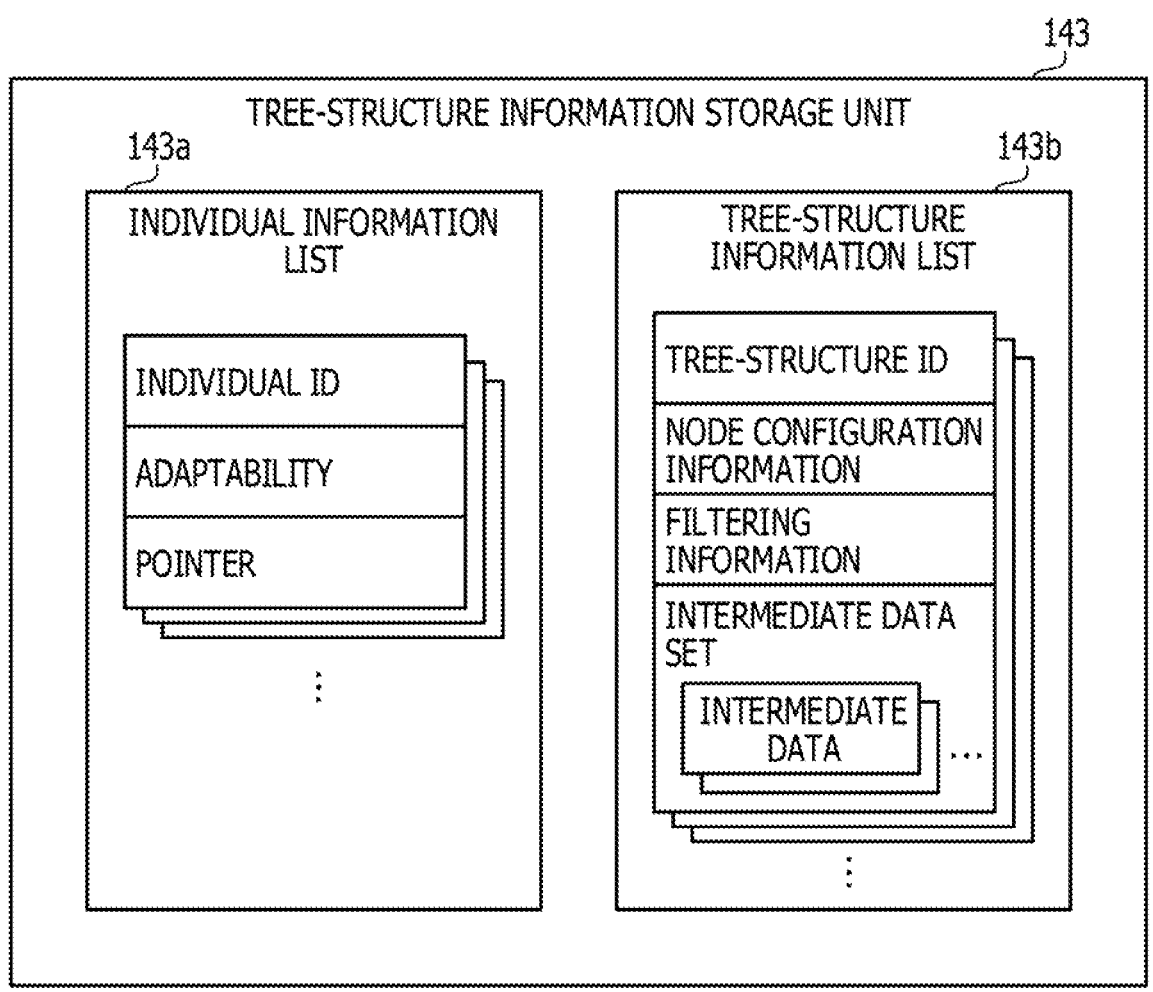
FIG. 5 is a diagram illustrating a configuration example of information stored in a tree-structure information storage unit.

Here, FIG. 5 is a diagram illustrating a configuration example of information stored in a tree-structure information storage unit. The tree-structure information storage unit 143 stores an individual information list 143a and a tree-structure information list 143b.

Records corresponding to the respective individuals included in the parent population 61 are registered in the individual information list 143a. An individual ID for identifying each individual, adaptability of the individual, and a pointer indicating a corresponding record in the tree-structure information list 143b are registered in each record.

Meanwhile, the tree-structure information list 143b independently maintains information regarding tree structures of the individuals in the information regarding the individuals. Records corresponding to the tree structures of the respective individuals are registered in the tree-structure information list 143b. In the embodiment, records in the individual information list 143a and records in the tree-structure information list 143b are associated in a one-to-one fashion using a pointer.

A tree structure ID, node configuration information, filtering information, and an intermediate data set are registered in each record in the tree-structure information list 143b. The tree structure ID is identification information for identifying a tree structure. The node configuration information indicates a connection relationship between the nodes included in the tree structure. The filtering information indicates the type of the image filtering incorporated in each node.

The intermediate data set includes intermediate data corresponding to each node. The intermediate data is data indicating a processing result that is output through processing of the image filtering incorporated in each node in the process of processing the input image 51 using the image processing program corresponding to the tree structure. In a case in which the processing result of the image filtering is an image, for example, image data is registered as the intermediate data. In a case in which the processing result of the image filtering is a numerical value, the numerical value is registered as the intermediate data.

The intermediate data is output in the process of the processing of calculating adaptability of the corresponding individual using the input image 51 and is then registered in the record of the tree-structure information list 143b as will be described later. In a case in which a plurality of input images 51 are used, the intermediate data set is generated for each input image 51 that has been input and is then registered in the record.

The aforementioned data structure in the tree-structure information storage unit 143 is just an example, and the record in the tree-structure information list 143b may be integrally stored with the corresponding record in the individual information list 143a, for example.

The following description will be given with reference to FIG. 4 again.

The program generation unit 120 has a learning control unit 121, an adaptability calculation unit 122, and a tree-structure analyzing unit 123.

The learning control unit 121 comprehensively controls the overall program generation processing performed by the program generation unit 120. For example, the learning control unit 121 executes processing such as generation of initial individuals to be included in the parent population 61, individual evolution processing, living individual selection and an output of a final image processing program based on adaptability, and updating of the parent population 61 with the individual selected in the living individual selection. The learning control unit 121 also executes processing of registering intermediate data generated in the process of calculating adaptability of the initial individuals and the slave individuals in the records in the tree-structure information list 143b.

The adaptability calculation unit 122 calculates adaptability for evaluating the individuals. Specifically, the adaptability calculation unit 122 performs image processing on the input image 51 included in the learning data pieces 50 in accordance with the image processing program constructed based on the tree structures of the individuals. The adaptability calculation unit 122 calculates, as adaptability of the individuals, similarity between the image obtained through the image processing and the target image associated with the input image.

The tree-structure analyzing unit 123 analyzes the tree structures of the slave individuals before calculating the adaptability of the slave individuals generated in the evolution process and specifies a subtree with a configuration that conforms to that of the subtree included in the slave individuals in the tree structures of the master individuals. The tree-structure analyzing unit 123 reads intermediate data output from the specified subtree from the tree-structure information list 143b and passes the read intermediate data as an output data of the subtree of the slave individuals to the adaptability calculation unit 122. In this case, the adaptability calculation unit 122 executes the slave individual adaptability calculation processing using the intermediate data passed from the tree-structure analyzing unit 123 as the output data of the subtree without executing the image processing on the subtree of the slave individuals.

Here, a specific example of the slave individual adaptability calculation processing will be described with reference to FIGS. 6 to 8.

Figure 6:
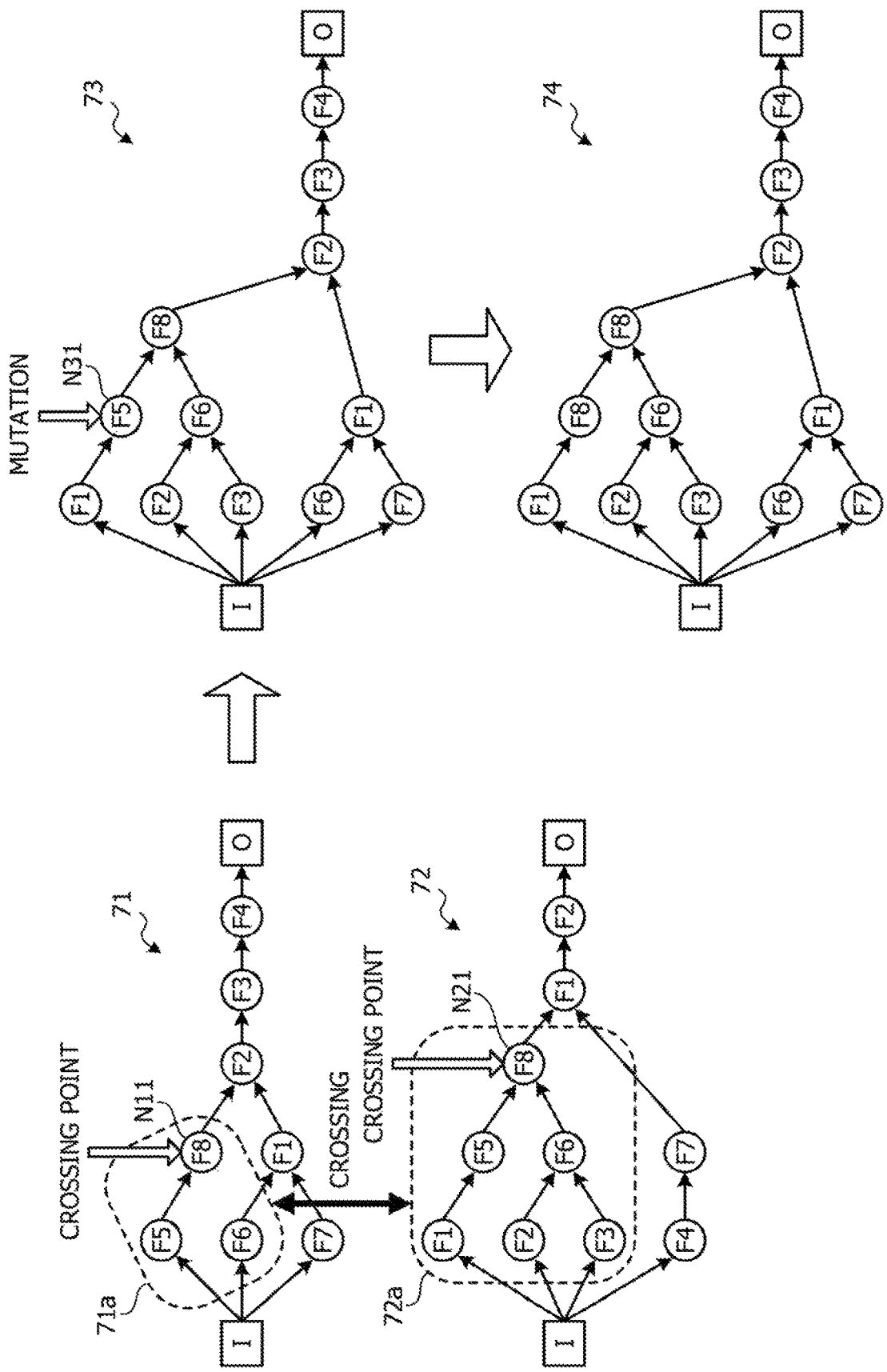
FIG. 6 is a diagram illustrating a generation example of a slave individual.

FIG. 6 is a diagram illustrating a generation example of slave individuals. FIG. 6 illustrates an example in which the slave individuals are generated using master individuals 71 and 72. It is assumed that the individuals are generated using eight types of image filtering F1 to F8 in an example in FIG. 6. Also, "I" is an input terminal for inputting an input image to a terminating node, and "O" is an output terminal for outputting a processing result of a head node.

First, it is assumed that a node N11 of the master individual 71 and a node N21 of the master individual 72 have respectively been designated as crossing points. In this case, a subtree 71a on the lower-order side (input side) with a root of the node N11 of the master individual 71 is replaced with a subtree 72a on the lower-order side with a root of the node N21 of the master individual 72. In this manner, a slave individual 73 in which the subtree 71a of the master individual 71 has been replaced with the subtree 72a is generated. Although a slave individual in which the subtree 72a of the master individual 72 has been replaced with the subtree 71*a* is also generated in practice, illustration in the drawing is omitted here.

Further, it is assumed that a node N31 of the generated slave individual 73 is designated as a point at which mutation is to occur, and that the filtering F5 of the node N31 is replaced with the filtering F8. In this manner, a slave individual 74 is generated. Then, adaptability of the slave individual 74 is calculated in the procedure illustrated in FIG. 7 described below.

Figure 7:
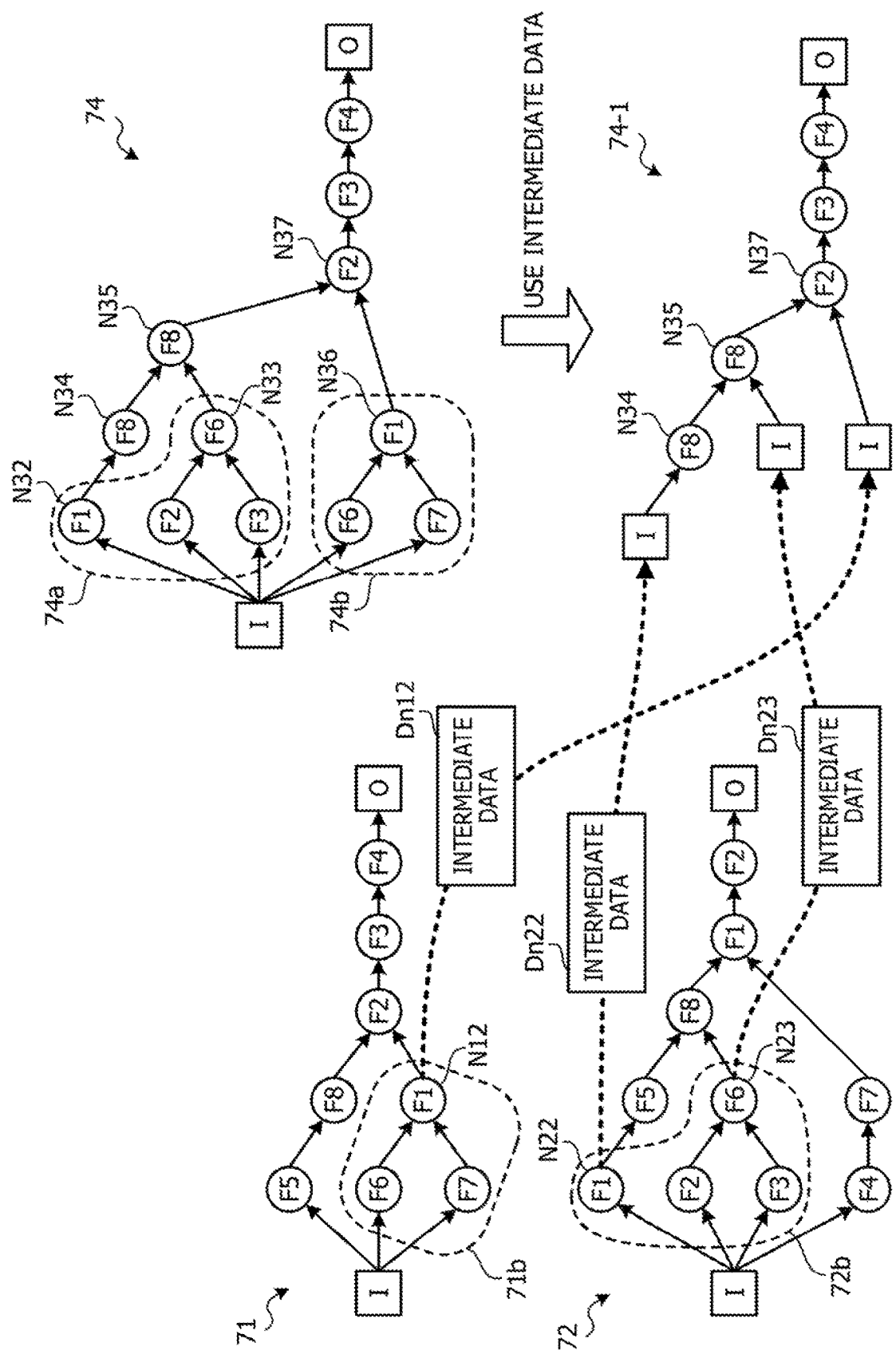
FIG. 7 is a diagram illustrating an example of slave individual adaptability calculation processing.

FIG. 7 is a diagram illustrating an example of slave individual adaptability calculation processing. The tree-structure analyzing unit 123 specifies a subtree with a configuration that conforms to that of a subtree included in the slave individual 74 from the tree structures of the master individuals 71 and 72.

Here, the subtrees as matching targets on which matching is performed to know whether or not the subtrees conform to each other correspond to partial tree structures (that is, partial tree structures including input terminals) positioned at terminations of the tree structures in both the master individuals and the slave individuals. The subtrees with the configurations that conform to each other mean subtrees with the same connection relationships between the nodes, with the same types of image filtering incorporated in the respective nodes, and also with the same types of image filtering incorporated in the nodes on the lower-order side for the nodes other than the terminating nodes. In the example illustrated in FIG. 7, it is determined that a subtree 74*a* of the slave individual 74 conforms to a subtree 72*b* of the master individual 72, and a subtree 74*b* of the slave individual 74 conforms to a subtree 71*b* of the master individual 71 as a result of the matching.

In this case, the tree-structure analyzing unit 123 reads intermediate data Dn12 corresponding to the node N12 of the master individual 71 from the record corresponding to the master individual 71 that is registered in the tree-structure information list 143*b*. The tree-structure analyzing unit 123 reads intermediate data Dn 22 and Dn23 respectively corresponding to the nodes N22 and N23 of the master individual 72 from the record corresponding to the master individual 72 that is registered in the tree-structure information list 143*b*.

The adaptability calculation unit 122 does not execute image processing on the input image 51 using the subtree 74*a*. Instead, the adaptability calculation unit 122 uses the intermediate data Dn22 and Dn23 respectively corresponding to the nodes N22 and N23 of the master individual 72 as output data of nodes N32 and N33 on the higher-order side (output side) of the subtree 74*a*. In this manner, the intermediate data Dn22 is input to the node N34, and the output data obtained by the processing at the node N34 and the intermediate data Dn23 are input to the node N35.

The adaptability calculation unit 122 does not execute image processing on the input image 51 using the subtree 74*b*. Instead, the adaptability calculation unit 122 uses the intermediate data Dn12 corresponding to the node N12 of the master individual 71 as output data of the node N36 on the output side of the subtree 74*b*. In this manner, the output data obtained through the processing performed at the node N35 and the intermediate data Dn12 are input to a node N37.

As described above, the adaptability calculation unit 122 can omit the execution of the image processing for the subtrees 74*a* and 74*b*. In this manner, it is possible to shorten the time for performing the image processing using the slave individual 74, and as a result, it is possible to shorten the time for calculating the adaptability of the slave individual 74. A tree structure 74-1 in FIG. 7 is represented by modifying the tree structure of the slave individual 74 for easy understanding of the node to which the intermediate data is input. As can be understood from the comparison between the tree structure 74-1 with the original tree structure of the slave individual 74, the number of processing steps using the intermediate data becomes five in contrast to the original tree structure for which the number of processing steps using the image filtering is twelve, and the number of processing steps is significantly reduced.

Figure 8:
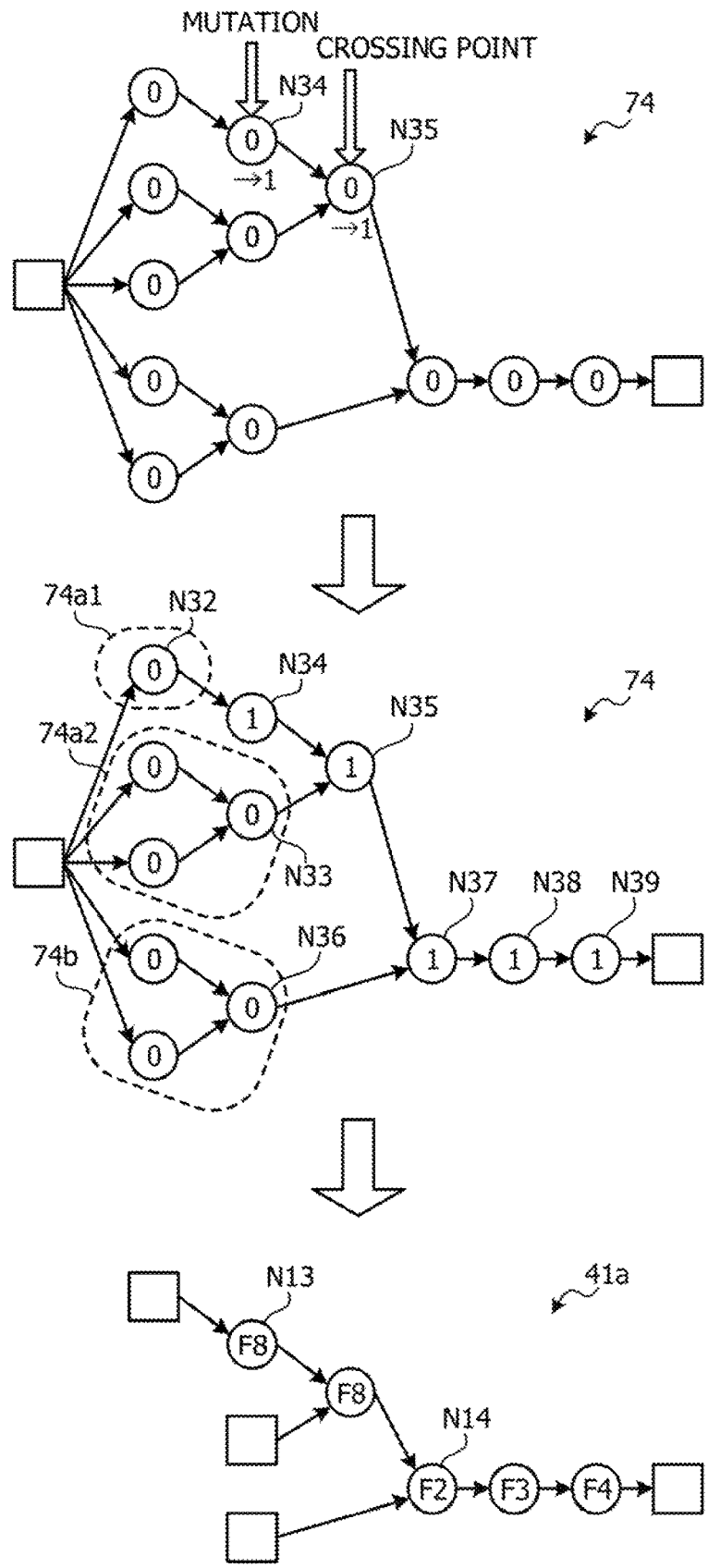
FIG. 8 is a diagram illustrating an example of a specific processing procedure for specifying a subtree as a target of matching.

FIG. 8 is a diagram illustrating an example of a specific processing procedure for specifying subtrees as targets of matching. In the embodiment, the tree-structure analyzing unit 123 specifies subtrees as targets of matching for which matching with a master individual is performed based on the tree structures of the slave individuals by applying flags to the respective nodes of the slave individuals. FIG. 8 illustrates, as an example, a case in which subtrees as targets of matching are specified from the slave individuals 74 illustrated in FIG. 7.

The tree-structure analyzing unit 123 sets the flags of all the nodes of the slave individual 74 to 0 and initializes the flags first. The flags indicate whether or not image processing using corresponding image filtering is to be executed, and 1 is set to nodes for which the image processing is to be executed.

Next, the tree-structure analyzing unit 123 specifies nodes that have been designated as a crossing point and a mutation point from the nodes of the slave individual 74. As illustrated on the upper side in FIG. 8, the node N35 is specified as the node that has been designated as the crossing point, and the node N34 is specified as the node that has been designated as the mutation point. The tree-structure analyzing unit 123 changes the flags of the specified nodes N34 and N35 to 1.

Next, the tree-structure analyzing unit 123 changes the flags of all the nodes on the higher-order side (output side) than the nodes with the flags, which have been changed to 1, to 1. In this manner, the flags of the nodes N37 to N39 are changed to 1 as illustrated on the lower side in FIG. 8.

In this state, the tree-structure analyzing unit 123 specifies the higher-order nodes (output-side nodes) with the flags of 1 among the nodes with the flags of 0. In the example illustrated in FIG. 8, the nodes N32, N33, and N36 are specified as such nodes. The tree-structure analyzing unit 123 specifies all the tree structures on the lower-order side (input side) with a root of the specified nodes as subtrees as targets of matching. In the example illustrated in FIG. 8, a subtree 74*a*1 with a root of the node N32, a subtree 74*a*2 with a root of the node N33, and a subtree 74*b* with a root of the node N36 are specified as the subtrees as the targets of matching.

The tree-structure analyzing unit 123 searches for subtrees that respectively conform to the specified subtrees 74*a*1, 74*a*2, and 74*b* among subtrees on the lower-order side in the master individuals 71 and 72 (the subtrees including input terminals). The tree-structure analyzing unit 123 reads intermediate data corresponding to root nodes of the respective searched subtrees from the tree-structure information list 143*b*. The adaptability calculation unit 122 uses the read intermediate data as output data of the respective root nodes of the subtrees 74*a*1, 74*a*2, and 74*b*.

By performing the aforementioned processing, the tree-structure analyzing unit 123 can reliably specify the subtrees as the targets of matching to be matched with the subtrees of the master individuals through simple processing.

Next, an image processing program generation processing performed by the image processing apparatus 100 will be described with reference to flowcharts.

Figure 9:
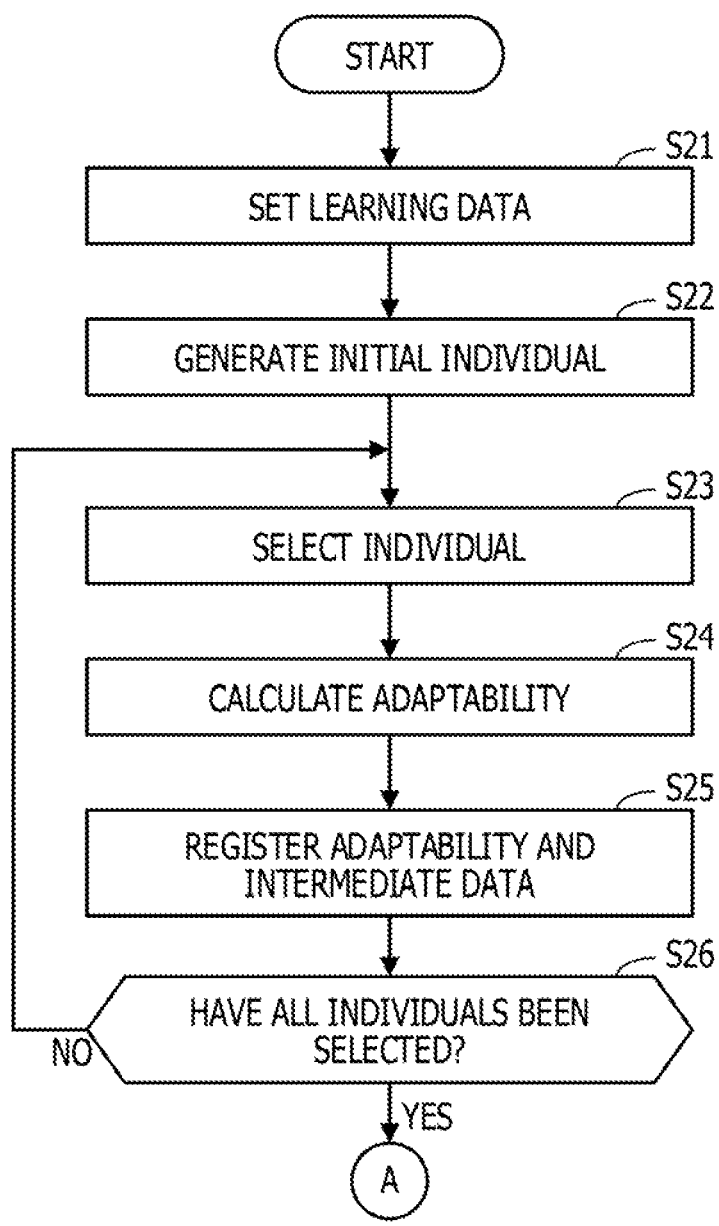
FIG. 9 is a flowchart (No. 1) illustrating an example of a procedure for program generation processing.
Figure 10:
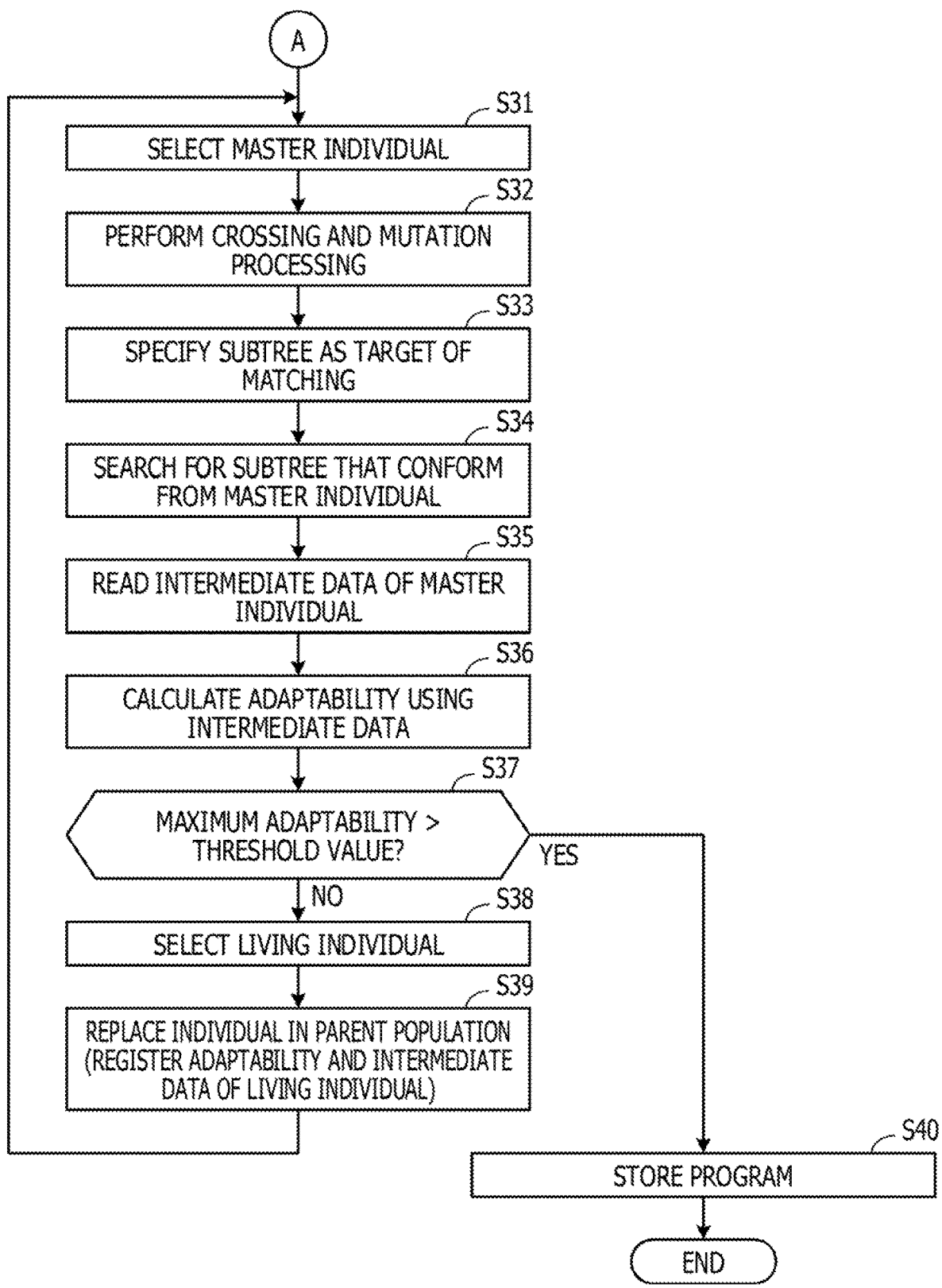
FIG. 10 is a flowchart (No. 2) illustrating the example of the procedure for program generation processing.

FIGS. 9 and 10 are flowcharts illustrating an example of the procedure for program generation processing.

S21: The learning control unit 121 receives an input operation for setting learning data. For example, learning data to be used in the processing is designated from learning data stored in the learning data storage unit 142. Alternatively, learning data to be used in the processing is registered in the learning data storage unit 142.

S22: The learning control unit 121 generates a predetermined number of initial individuals to be included in the parent population 61. The respective initial individuals are generated by randomly selecting image filtering registered in the filtering set storage unit 141 and combining the image filtering with the respective nodes with the tree structures. The tree structures of the respective initial individuals are randomly selected from a plurality of tree structures decided in advance. Alternatively, the tree structures themselves may be randomly decided.

The learning control unit 121 registers the generated information related to the respective initial individuals in the tree-structure information list 143b. Specifically, the learning control unit 121 newly registers records corresponding to the tree structures of the generated initial individuals in the tree-structure information list 143b and registers tree-structure IDs, node configuration information, and filtering information in the records. The learning control unit 121 newly registers records corresponding to the generated initial individuals in the individual information list 143a, registers the individual IDs in the records, and also registers pointers indicating the newly registered records in the tree-structure information list 143b.

S23: The learning control unit 121 selects one individual from the parent population 61 and asks the adaptability calculation unit 122 to calculate adaptability of the selected individual.

S24: The adaptability calculation unit 122 calculates the adaptability of the individual selected in S23. Specifically, the adaptability calculation unit 122 performs image processing on an input image included in learning data in accordance with an image processing program corresponding to the selected individual. The adaptability calculation unit 122 temporarily saves intermediate data output from the respective nodes in the process of executing the image processing in the RAM 102. The adaptability calculation unit 122 calculates, as adaptability of the selected individual, similarity between the image obtained through the image processing and the target image associated with the input image. In a case in which a plurality of learning data pieces have been registered, the adaptability calculation unit 122 calculates the similarity using the respective learning data pieces and regards an average value of the similarity as the adaptability of the individual, for example.

S25: The learning control unit 121 registers the adaptability calculated in S24 in a record corresponding to the selected individual among the records in the individual information list 143a. Also, the learning control unit 121 registers the intermediate data output from the respective nodes in the process of executing the image processing based on the selected individual in an item of an intermediate data set of the record corresponding to the selected individual among the records in the tree-structure information list 143b.

S26: The learning control unit 121 determines whether or not all the individuals included in the parent population 61 have been selected. In a case in which there are unselected individuals, the learning control unit 121 executes the processing in S23 thereon. Meanwhile, in a case in which all the individuals have already been selected, the learning control unit 121 executes processing in S31 in FIG. 10.

S31: The learning control unit 121 randomly selects two master individuals among the individuals included in the parent population 61.

S32: The learning control unit 121 generates two or more and a predetermined number of slave individuals by performing crossing between the selected two master individuals. Further, the learning control unit 121 causes mutation at any of the nodes of the generated slave individuals and replaces image filtering incorporated in a node of an original slave individual with any of other image filtering registered in the filtering set storage unit 141. The learning control unit 121 temporarily stores the positions of the node at the crossing point and the node, at which the mutation has occurred, in the slave individuals in the RAM 102.

S33: The tree-structure analyzing unit 123 specifies subtrees as targets of matching from the respective tree structures of the generated slave individuals.

S34: The tree-structure analyzing unit 123 executes the following processing on the respective generated slave individuals. The tree-structure analyzing unit 123 searches for subtrees that conform to the subtrees as targets of matching specified from the slave individuals based on the tree structures of the two master individuals selected in S31. The tree structures of the two master individuals are specified from records associated with the respective master individuals among the records in the tree-structure information list 143b. In other words, only two records associated with the two respective master individuals are referred among the records in the tree-structure information list 143b in the processing in S34.

S35: The tree-structure analyzing unit 123 executes the following processing on the respective generated slave individuals. The tree-structure analyzing unit 123 reads intermediate data corresponding to root nodes of the subtrees searched from the master individuals in S34 from records associated with the master individuals among the records in the tree-structure information list 143b. In a case in which a plurality of input images are used, the intermediate data is read for the respective input images.

S36: The adaptability calculation unit 122 calculates the adaptability of the respective generated slave individuals.

In the slave individual adaptability calculation, the input image included in the learning data is used as an input, the image processing is executed in accordance with the image processing programs corresponding to the slave individuals, and an image is output as a processing result thereof. However, the adaptability calculation unit 122 sets the intermediate data read in S35 as outputs from the uppermost nodes of the subtrees as the targets of ma specified from the slave individuals in S33 as described with reference to FIGS. 7 and 8 in the process of executing the image processing. In this manner, the execution of the image processing based on the subtrees is omitted.

The adaptability calculation unit 122 calculates, as adaptability of the slave individuals, similarity between the output image and the target image associated with the input image. In a case in which a plurality of learning data pieces have been registered, the adaptability calculation unit 122 calculates the similarity using the respective learning data pieces and regards an average value of the similarity as the adaptability of the individual, for example, similarly to S24.

S37: The learning control unit 121 acquires the adaptability of the respective master individuals selected in S31 from the individual information list 143a. The learning control unit 121 specifies the maximum adaptability from the adaptability of the respective master individuals and the adaptability of the respective slave individuals calculated in S36 and determines whether or not the maximum adaptability is greater than a predetermined threshold value. The learning control unit 121 executes processing in S40 in a case in which the maximum adaptability is greater than the threshold value, or executes processing in S38 in a case in which the maximum adaptability is equal to or less than the threshold value.

S38: The learning control unit 121 selects with the maximum adaptability as an individual that is allowed to live among the respective master individuals selected in S31 and the respective slave individuals generated in S32. Further, the learning control unit 121 selects one individual that is allowed to live from the remaining individuals. In the selection, an individual that is allowed to live is selected at a probability of the adaptability of each of the remaining individuals.

S39: The learning control unit 121 replaces the master individuals selected in S31 among the individuals included in the parent population 61 with the two individuals selected in S38. In this manner, the generation of the parent population 61 is updated.

In the processing, the learning control unit 121 deletes records corresponding to the master individuals from the individual information list 143a and the tree-structure information list 143b. The learning control unit 121 adds a record corresponding to the individual that is allowed to live to the individual information list 143a and registers an individual ID and adaptability in the record. Further, the learning control unit 121 adds a record corresponding to a tree structure of the individual that is allowed to live to the tree-structure information list 143b and registers a tree-structure ID, node configuration information, filtering information, and an intermediate data set in the record. Intermediate data output from the respective nodes of the individual that is allowed to live in the process of calculating the adaptability of the individual is registered in the intermediate data set. However, intermediate data corresponding to the nodes included in the same subtrees of the master individuals may also be used as the intermediate data for the nodes included in the subtrees as targets of matching. Also, the learning control unit 121 registers a pointer indicating a record that has been added to the tree-structure information list 143b to the record that has been added to the individual information list 143a.

In a case in which a master individual is selected as the individual that is allowed to live, records that are included in the individual information list 143a and the tree-structure information list 143b and correspond to the master individual may be left without being deleted.

S40: The learning control unit 121 stores an image processing program corresponding to the individual with the adaptability that has been determined to be greater than the threshold value in S37 in the program storage unit 130 and ends the processing. In a case in which a plurality of individuals with adaptability that are greater than the threshold value are present in S37, the learning control unit 121 stores the image processing program corresponding to the individual with the maximum adaptability among these individuals in the program storage unit 130.

According to the aforementioned second embodiment, the execution of the image processing corresponding to the subtrees with the same content as that the subtrees of the master individuals in the tree structures of the slave individuals by using the saved intermediate data when the adaptability of the slave individuals is calculated. In this manner, it is possible to shorten the time for calculating adaptability of the slave individuals. As a result, it is possible to shorten the time until the optimal image processing program is generated.

Third Embodiment

Next, an image processing apparatus according to a third embodiment will be described. The image processing apparatus according to the third embodiment is achieved by modifying a part of the processing performed by the image processing apparatus 100 according to the second embodiment. In the following description, reference numerals that are similar to those in the second embodiment will be used for components in the image processing apparatus according to the third embodiment.

In the second embodiment, only the information regarding the slave individual that is allowed to live among the generated slave individuals is registered in the tree-structure information storage unit 143 when the generation change is performed. In this manner, only the information regarding the individuals included in the parent population 61 is registered in the tree-structure information storage unit 143, and also, only the data corresponding to the individuals included in the parent population 61 is registered in regard to the intermediate data.

Meanwhile, intermediate data corresponding to the slave individuals that are not allowed to live among the generated slave individuals is also registered in the tree-structure information storage unit 143 in the third embodiment. More specifically, records regarding the slave individuals that have not been allowed to live are also registered in the tree-structure information list 143b. Corresponding records of the slave individuals are not registered in the individual information list 143a. That is, only the records regarding the individuals included in the parent population 61 are registered in the individual information list 143a while records regarding tree structures of the slave individuals that have not been allowed to live are also registered in the tree-structure information list 143b in addition to those of the individuals included in the parent population 61.

In the third embodiment, the subtree with the same content of the subtrees of the slave individuals is searched not only from the master individuals but also from all the tree structures registered in the tree-structure information list 143b. That is, the tree-structure information list 143b is used as a database of the tree structures for searching for the subtree with the same content as those of the subtrees of the slave individuals. Further, a range specified as subtrees as targets of matching in the tree structures of the slave individuals is expanded in the third embodiment as compared with that in the second embodiment. In this manner, the range in which the execution of the image processing may be omitted when the adaptability of the slave individuals is calculated is expanded, thereby increasing the effect of shortening the processing time.

Figure 11:
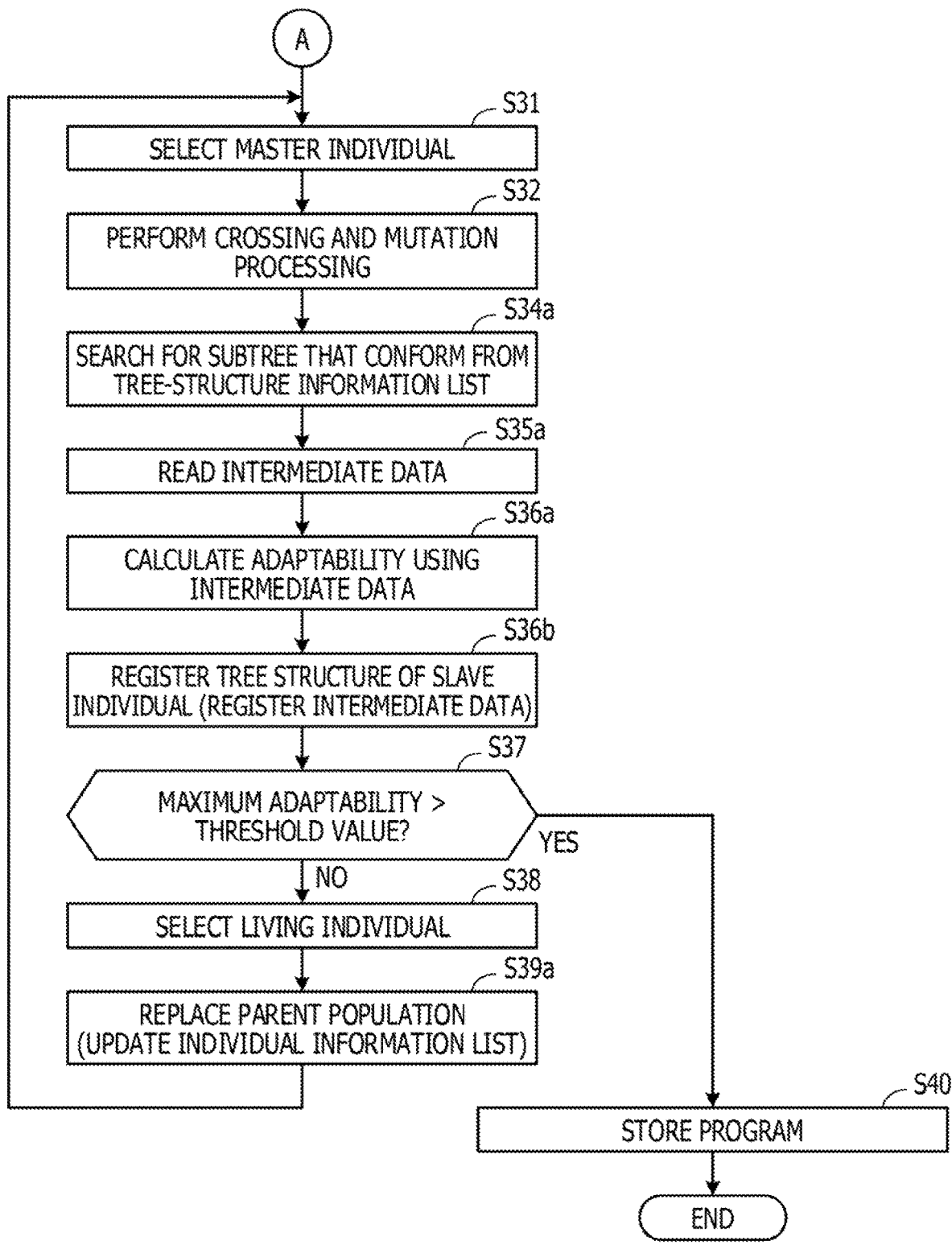
FIG. 11 is a flowchart illustrating an example of a procedure for program generation processing in an image processing apparatus according to a third embodiment.

FIG. 11 is a flowchart illustrating an example of a procedure for program generation processing in the image processing apparatus according to the third embodiment. The image processing apparatus 100 according to the third embodiment executes the processing that is similar to that in FIG. 9 and then executes processing in FIG. 11. In FIG. 11, the same step numbers as those in FIG. 10 are applied to the processing steps with the same processing content.

The image processing apparatus 100 the processing in S31 and S32 and then executes the next processing in S34a.

S34a: The tree-structure analyzing unit 123 executes the following processing on the respective generated slave individuals.

The tree-structure analyzing unit 123 searches for the subtree that conforms to the subtrees included in the slave individuals among the tree structures registered in the tree-structure information list 143b. In the processing, the range specified as the subtrees as targets of matching in the tree structures of the slave individuals is expanded as compared with that in the second embodiment.

In the third embodiment, the tree-structure analyzing unit 123 selects a head node of the tree structures of the slave individuals first and a subtree (in this case, the entire tree structure) with a root of the node is regarded as a target of matching, for example. The tree-structure analyzing unit 123 searches for a tree structure that have a subtree that conforms to the subtree that has been regarded as the target of matching on the lower-order side among the tree structures registered in the tree-structure information list 143b. In a case in which such a tree structure has not been found, the tree-structure analyzing unit 123 selects a node in a lower order from the tree structure of the slave individual by one level and regards a subtree with a root of the node as a target of matching. Then, the tree-structure analyzing unit 123 searches for a tree structure that has a subtree that conforms to the subtree that has been regarded as the target of matching on the lower-order side among the tree structures registered in the tree-structure information list 143b in a manner similar to that described above. In this manner, the tree-structure analyzing unit 123 sequentially selects the nodes of the tree structures of the slave individuals from the head and searches for the subtree that conforms to the subtree as a target of matching while gradually reducing the subtrees as the targets of matching.

Also, a load of the searching processing is high in the aforementioned processing of sequentially selecting the nodes of the slave individuals from the head node. Thus, the load of the searching processing may be reduced by restricting the range in which the subtrees as targets of matching are specified by a method illustrated in FIG. 12 described below, for example.

FIG. 12 is a diagram illustrating an example of matching target subtree specification processing based on crossing points and mutation points. Referring to FIG. 12, a case in which subtrees as targets of matching are specified from the slave individuals 74 illustrated in FIG. 8 will be described as an example.

The tree-structure analyzing unit 123 sets the flags of all the nodes of the slave individual 74 to 0 and initializes the flags first. Next, the tree-structure analyzing unit 123 specifies the node N34 designated as a mutation point and the node N35 designated as the crossing point among the nodes of the slave individual 74. The processing described hitherto is similar to that in the example illustrated in FIG. 8.

Next, the tree-structure analyzing unit 123 specifies the node N35 on the higher order side in the node N34 designated as the mutation point and the node N35 designated as the crossing point, unlike the example illustrated in FIG. 8. Then, the tree-structure analyzing unit 123 changes the flags of all the nodes N37 to N39 positioned on the higher-order side than the specified node N35 to 1.

Next, the tree-structure analyzing unit 123 specifies higher-order nodes N35 and N36 with the flags of 1 among the nodes with the flags of 0. Then, the tree-structure analyzing unit 123 specifies subtrees 74c and 74d with roots of the specified nodes N35 and N36, respectively, as subtrees as initial targets of matching as illustrated on the lower side in FIG. 12.

The tree-structure analyzing unit 123 searches for a tree structure with a subtree that conforms to the subtrees 74c and 74d from the tree structures registered in the tree-structure information list 143b. In a case in which the tree structure with the subtree that conforms to the subtree 74c has not been found, for example, the tree-structure analyzing unit 123 newly specifies subtrees with the nodes N33 and N34, respectively, on the lower-order side of the node N35 as subtrees as the targets of matching. Then, the tree-structure analyzing unit 123 searches for a tree structure with a subtree that conforms to these subtrees from the tree structures registered in the tree-structure information list 143b.

In the example illustrated in FIG. 8, only the subtrees located on the lower-order side than the nodes designated as the crossing point and the mutation point are specified as the subtrees as the targets of matching. Meanwhile, the subtrees with the root nodes located on the higher-order side and with more nodes are specified as the subtrees as the targets of matching in the example illustrated in FIG. 12. In a case in which a subtree that conforms to such subtrees with more nodes has not been found among the registered tree structures, the adaptability calculation unit 122 can omit execution of image processing at more nodes than that in the example illustrated in FIG. 8. As a result, it is possible to shorten the time for calculating adaptability. Further, it is possible to reduce the number of nodes included in the subtrees as the target of matching and the number of times the subtrees as the targets of matching are specified again as compared with a case in which a root node of the subtree as an initial target of matching is assumed to be the head node of the slave individual, and to thereby reduce the load of the searching processing.

The following description will be given with reference to FIG. 11 again.

S35a: The tree-structure analyzing unit 123 executes the following processing on the respective generated slave individuals. The tree-structure analyzing unit 123 refers to a record corresponding to a tree structure, from which the subtree that conforms to the subtree as the target of matching in S34a has been found, among the records in the tree-structure information list 143b. The tree-structure analyzing unit 123 reads intermediate data corresponding to root nodes of the subtree from the records in a reference destination. In a case in which a plurality of input images are used, the intermediate data is read for the respective input images.

S36a: The adaptability calculation unit 122 calculates the adaptability of the respective generated individuals. The procedure for the calculation processing is similar to that in S36 in FIG. 10 other than that the intermediate data read in S35a is used and that the intermediate data used is not limited to that of the master individuals.

S36b: The learning control unit 121 registers the records corresponding to the tree structures of the respective slave individuals generated in S32 in the tree-structure information list 143b. At this time, the intermediate data obtained from the respective nodes in the process of calculating the slave individuals is registered in the item of the intermediate data set.

If the processing described hitherto ends, the learning control unit 121 executes processing in S37. In a case in which a determination result in S37 is No, the learning control unit 121 executes processing in S38 and then executes processing in S39a.

S39a: The learning control unit 121 replaces the master individuals selected in S31 among the individuals included in the parent population 61 with the two individuals selected in S38. In this manner, the generation of the parent population 61 is updated.

In S39a, the learning control unit 121 registers a record corresponding to the individual that is allowed to live in the individual information list 143a and registers an individual ID, adaptability, and a point in the record. The pointer is set such that the pointer indicates the record corresponding to the tree structure of the individual that is allowed to live among the records registered in the tree-structure information list 143b in S36b.

Here, information indicating the tree structures of all the newly generated slave individuals is registered in the tree-structure information list 143b in S36b. Meanwhile, since only the information indicating the individual that is allowed to live is registered in the individual information list 143a in S39a, the individual information list 143a maintains only the records of the individuals included in the parent population 61.

In the third embodiment described hitherto, the range in which the subtree that conforms to the subtrees that the slave individuals have is searched is expanded not only to the tree structures of the master individuals but also to the tree structures of all the generated individuals. A degree of freedom of the subtrees that are set as the targets of matching in the slave individuals also increases. In this manner, there is a higher probability that the number of nodes on which execution of image processing is omitted when the adaptability of the slave individuals is calculated increases, and there is also a higher probability that the time for calculating the adaptability is reduced than in the second embodiment.

The processing functions of the apparatuses (the information processing apparatus 1 and the image processing apparatus 100) described in the aforementioned embodiments can be realized by a computer. In that case, the aforementioned processing functions are realized on the computer by providing a program that describes processing content of the functions that the respective apparatuses are to have and executing the program using the computer. The program that describes the processing content can be recorded in a computer-readable recording medium. Examples of the computer-readable recording medium include a magnetic storage device, an optical disc, a magneto-optical recording medium, a semiconductor memory, and the like. Examples of the magnetic storage device include a hard disk drive (HDD), a flexible disk (FD), a magnetic tape, and the like. Examples of the optical disk include a digital versatile disc (DVD), a DVD-RAM, a compact disc-read only memory (CD-ROM), a CD-recordable/rewritable (R/RW), and the like. Examples of the magneto-optical recording medium include a magneto-optical disk (MO) and the like.

In a case in which the program is distributed, portable recording media such as DVDs or CD-ROMs in which the program is recorded, for example, are sold. It is also possible to store the program in a storage device of a server computer and transfer the program from the server computer to other computers via a network.

The computer that executes the program stores the program, which is recorded in the portable recording medium or has been transferred from the server computer, in a storage device of the computer, for example. Then, the computer reads the program from the storage device of the computer and executes processing in accordance with the program. The computer can also read the program directly from the portable recording medium and execute the processing in accordance with the program. The computer can also sequentially execute the processing in accordance with the received program every time the program is transferred from the server computer connected thereto via the network.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
a memory that stores information indicating a first individual that is expressed with a tree structure that has one or more nodes, each of which corresponds to a program element for image processing and a processing result that is output by each node of the first individual in a process of executing image processing based on the first individual; and
a processor coupled to the memory and configured to:
generate a second individual as a candidate of an individual of a next generation in genetic programming based on the first individual;
specify subtrees that have the same content and include terminating nodes between a tree structure indicating the second individual and a tree structure indicating the first individual;
acquiring an executing result of image processing based on the second individual by using a processing result output by a head node of the subtree included in the first individual, which is stored in the memory, instead of executing image processing based on the subtree included in the second individual; and
calculating adaptability of the second individual based on the acquired executing result,
wherein the processor is configured to:
specify a first node at a head of a region in which crossing has been performed and a second node at which mutation has been performed among the nodes of the second individual,
specify a node that is in an output side of the first node and the second node as a third node among the nodes of the second individual,
specify a fifth node to which any of the first, second, and third nodes is connected on the output side from among fourth nodes other than the first, second, and third nodes among the nodes of the second individual, and
regard a region with a root of the fifth node in the tree structure indicating the second individual as the subtree and search for the subtree from the tree structure indicating the first individual.

2. The information processing apparatus according to claim 1, wherein the processor is configured to:
generate a plurality of individuals included in a parent population and register the individuals in the memory,
calculate adaptability of each of the plurality of individuals and store the adaptability in the memory, store processing results output from the respective nodes in a process of calculating the adaptability for each of the plurality of individuals in the memory, and select the first individual from the parent population to generate the second individual.

3. The information processing apparatus according to claim 2, wherein the processor is configured to repeatedly execute processing of generating the second individual, processing of specifying the subtree, processing of calculating the adaptability of a slave individual, and generation change processing and the generation change processing includes:

selecting a living individual from the first individual and the second individual based on the adaptability of the first individual and of the second individual, when the second individual is selected as the living individual, replacing an individual selected from the parent population with the second individual, and updating a processing result at each node of the selected individual that is stored in the memory by replacing with a processing result at each node of the second individual that is output when a process of calculating the adaptability of the second individual is executed.

4. The information processing apparatus according to claim 3, wherein the generation change processing includes processing of registering a third individual that has not been selected as the living individual in the first individual and the second individual in a population of individuals that is different from the parent population and saving a processing result output from each node of the third individual in a process of calculating adaptability of the third individual in the memory, the processing of specifying the subtree includes processing of specifying the subtree from the individuals included in the parent population and the population of individuals, and the processing of calculating the adaptability of the second individual includes reading, from the memory, a processing result at a head node of the subtree included in the individual, the subtree of which has been specified, among the individuals included in the parent population and the population of individuals, and setting the read processing result as a result of executing image processing based on the subtree included in the second individual.

5. An information processing method executed by a computer, the method comprising:

storing information indicating a first individual that is expressed with a tree structure that has one or more nodes, each of which corresponds to a program element for image processing and a processing result that is output by each node of the first individual in a process of executing image processing based on the first individual;

generating a second individual as a candidate of an individual of a next generation in genetic programming based on the first individual;

specifying subtrees that have the same content and include terminating nodes between a tree structure indicating the second individual and a tree structure indicating the first individual;

acquiring an executing result of image processing based on the second individual by using a processing result output by a head node of the subtree included in the first individual, which is stored in the memory, instead of executing image processing based on the subtree included in the second individual; and calculating adaptability of the second individual based on the acquired executing result, wherein the specifying of the subtree includes:

specifying a first node at a head of a region in which crossing has been performed and a second node at which mutation has been performed among the nodes of the second individual, specifying a node that is in an output side of the first node and the second node as a third node among the nodes of the second individual, specifying a fifth node to which any of the first, second, and third nodes is connected on the output side from among fourth nodes other than the first, second, and third nodes among the nodes of the second individual, and regarding a region with a root of the fifth node in the tree structure indicating the second individual as the subtree and searching for the subtree from the tree structure indicating the first individual.

6. The information processing method according to claim 5, further comprising:

generating a plurality of individuals included in a parent population and registering the individuals in the memory;

calculating adaptability of each of the plurality of individuals and storing the adaptability in the memory; and storing processing results output from the respective nodes in a process of calculating the adaptability for each of the plurality of individuals in the memory, wherein the generating of the second individual includes selecting the first individual from the parent population.

7. The information processing method according to claim 6, further comprising:

repeatedly executing processing of generating the second individual, processing of specifying the subtree, processing of calculating the adaptability of a slave individual, and generation change processing, and wherein the generation change processing includes:

selecting a living individual from the first individual and the second individual based on the adaptability of the first individual and of the second individual, when the second individual is selected as the living individual, replacing an individual selected from the parent population with the second individual, and updating a processing result at each node of the selected individual that is stored in the memory by replacing with a processing result at each node of the second individual that is output when a process of calculating the adaptability of the second individual is executed.

8. The information processing method according to claim 7, wherein the generation change processing includes processing of registering a third individual that has not been selected as the living individual in the first individual and the second individual in a population of individuals that is different from the parent population and saving a processing result output from each node of the third individual in a process of calculating adaptability of the third individual in the memory, the processing of specifying the subtree includes processing of specifying the subtree from the individuals included in the parent population and the population of individuals, and the processing of calculating the adaptability of the second individual includes reading, from the memory, a processing result at a head node of the subtree included in the individual, the subtree of which has been specified, among the individuals included in the parent population and the population of individuals, and setting the read processing result as a result of executing image processing based on the subtree included in the second individual.

9. A non-transitory computer-readable storage medium storing a program that causes a computer to execute a process, the process comprising:

storing information indicating a first individual that is expressed with a tree structure that has one or more nodes, each of which corresponds to a program element for image processing and a processing result that is output by each node of the first individual in a process of executing image processing based on the first individual;

generating a second individual as a candidate of an individual of a next generation in genetic programming based on the first individual;

specifying subtrees that have the same content and include terminating nodes between a tree structure indicating the second individual and a tree structure indicating the first individual; and acquiring a processing result of image processing based on the second individual by using a processing result output by a head node of the subtree included in the first individual, which is stored in the memory, instead of executing image processing based on the subtree included in the second individual; and calculating adaptability of the second individual based on the acquired executing result, wherein the specifying of the subtree includes:

specifying a first node at a head of a region in which crossing has been performed and a second node at which mutation has been performed among the nodes of the second individual, specifying a node that is in an output side of the first node and the second node as a third node among the nodes of the second individual, specifying a fifth node to which any of the first, second, and third nodes is connected on the output side from among fourth nodes other than the first, second, and third nodes among the nodes of the second individual, and regarding a region with a root of the fifth node in the tree structure indicating the second individual as the subtree and searching for the subtree from the tree structure indicating the first individual.

* * * * *